United States Patent
Surana et al.

(10) Patent No.: US 9,930,174 B2
(45) Date of Patent: Mar. 27, 2018

(54) PLUG-IN EXTENSION TO INTEGRATE PMS/CRM SYSTEM WITH PHONE SYSTEM

(71) Applicants: Hemesh Surana, Laguna Niguel, CA (US); Rachna Surana, Laguna Niguel, CA (US)

(72) Inventors: Hemesh Surana, Laguna Niguel, CA (US); Rachna Surana, Laguna Niguel, CA (US)

( * ) Notice: Subject to any disclaimer, the term of this patent is extended or adjusted under 35 U.S.C. 154(b) by 0 days.

(21) Appl. No.: 15/409,116

(22) Filed: Jan. 18, 2017

(65) Prior Publication Data
US 2017/0214793 A1 Jul. 27, 2017

Related U.S. Application Data

(60) Provisional application No. 62/281,299, filed on Jan. 21, 2016.

(51) Int. Cl.
*H04M 1/56* (2006.01)
*H04M 15/06* (2006.01)
(Continued)

(52) U.S. Cl.
CPC ........ *H04M 3/42323* (2013.01); *G06Q 30/01* (2013.01); *H04M 3/42068* (2013.01); *H04M 3/42331* (2013.01); *H04M 3/5183* (2013.01)

(58) Field of Classification Search
CPC ... H04L 67/104; H04L 67/22; H04L 67/2819; H04M 2203/1091; H04M 2203/12011; H04M 2203/12016; H04M 2203/1652; H04M 2207/20; H04M 1/56; H04M 3/42068; G06Q 10/107; G06Q 30/02; G06Q 30/0201; G06Q 30/0204; G06Q 10/0631; G06Q 10/10

USPC .... 379/142.01, 142.06, 142.15, 142.17, 196, 379/198, 265.01, 265.02, 265.04, 265.09, 379/309, 233

See application file for complete search history.

(56) References Cited

U.S. PATENT DOCUMENTS 6,427,132 B1 7/2002 Amuah
6,883,023 B1 * 4/2005 Wang .................... G06F 1/1632
709/220

(Continued)

FOREIGN PATENT DOCUMENTS

WO 2016189350 A1 12/2016

OTHER PUBLICATIONS

Wenzel, "Avaya Customer Relationship Management (CRM) Integration; Avaya the Power of We." (Jan. 1, 2011).

*Primary Examiner* — Binh Kien Tieu

(57) ABSTRACT

A plug-in extension is provided that integrates an existing PMS/CRM (Practice Management System/Customer Relationship Management System) suite with an existing telephone system. The present invention includes an add-on or a teleprompter system, wherein the add-on acts as a guide for users those are involved in customer service process. The user is prompted with a user interface screen on her computer, based on appropriate caller's status as an existing customer or otherwise and the user is provided with business contextual information and/or a series of canned scripts, designed to provide a structured series of easy-to-follow steps for the user to follow; thus, resulting in providing a minimal training to perform customer service functions in an enterprise.

19 Claims, 6 Drawing Sheets

(51) Int. Cl.
*H04M 7/00* (2006.01)
*H04M 3/42* (2006.01)
*H04M 3/51* (2006.01)
*G06Q 30/00* (2012.01)

(56) References Cited

U.S. PATENT DOCUMENTS

| | | | |
|---|---|---|---|
| 7,127,238 B2 | 10/2006 | Vandermeijden | |
| 7,353,182 B1* | 4/2008 | Missinhoun | G06Q 10/0631 |
| | | | 705/7.12 |
| 7,408,925 B1* | 8/2008 | Boyle | H04M 7/006 |
| | | | 370/352 |
| 9,054,909 B2* | 6/2015 | Shtiegman | H04L 29/06027 |
| 9,509,838 B2 | 11/2016 | Leeds | |
| 2003/0026403 A1* | 2/2003 | Clapper | H04M 1/575 |
| | | | 379/142.06 |
| 2006/0072726 A1* | 4/2006 | Klein | H04M 3/42153 |
| | | | 379/201.01 |
| 2007/0265873 A1 | 11/2007 | Urvashi | |
| 2009/0028302 A1* | 1/2009 | Chang | H04M 3/493 |
| | | | 379/88.04 |
| 2010/0091963 A1* | 4/2010 | Frey | H04M 3/42263 |
| | | | 379/112.06 |
| 2010/0235268 A1* | 9/2010 | Conrad | G06Q 10/10 |
| | | | 705/30 |
| 2010/0267374 A1* | 10/2010 | Armstrong | H04Q 3/0045 |
| | | | 455/417 |
| 2012/0170725 A1* | 7/2012 | Ramanathan | H04M 3/42042 |
| | | | 379/93.01 |
| 2012/0202474 A1* | 8/2012 | Gisby | H04M 3/4234 |
| | | | 455/417 |
| 2014/0289046 A1* | 9/2014 | Bukkapatnam | G06Q 30/0267 |
| | | | 705/14.57 |
| 2015/0304468 A1* | 10/2015 | Vaananen | G06F 17/30864 |
| | | | 455/415 |
| 2016/0034260 A1 | 2/2016 | Ristock | |
| 2016/0078455 A1* | 3/2016 | O'Donnell | G06Q 30/0201 |
| | | | 705/7.29 |
| 2016/0127536 A1* | 5/2016 | Jayapalan | H04M 3/2281 |
| | | | 379/265.02 |
| 2016/0232463 A1* | 8/2016 | McDonough | G06Q 50/01 |
| 2016/0277884 A1* | 9/2016 | Ehrman | G06Q 10/08 |
| 2016/0291808 A1 | 10/2016 | Wang | |
| 2016/0306685 A1 | 10/2016 | Allen | |
| 2017/0054852 A1 | 2/2017 | McGreevy | |
| 2017/0134443 A1* | 5/2017 | Lawson | H04L 65/1069 |

* cited by examiner

PLUG-IN EXTENSION TO INTEGRATE PMS/CRM SYSTEM WITH PHONE SYSTEM

CROSS-REFERENCE TO RELATED APPLICATION

This application claims the benefit of U.S. Provisional Pat. App. No. 62/281,299 filed on Jan. 21, 2016, the disclosures of which are hereby incorporated by reference in their entirety.

FIELD OF THE INVENTION

The present invention relates to integration of a telephony system with a customer relationship management system, and more particularly, to an application extension plugin for integrating existing PMS or CRM systems with existing phone systems to provide comprehensive information about a caller.

BACKGROUND OF INVENTION

Customer relationship management (CRM) and practice management systems (PMS) provide the capability of creating and maintaining information regarding customers such as from first contact through purchase and post-sales. The CRM/PMS systems provide features and capabilities such as improving the manner of marketing, sales and/or customer service organizations targeting new customers, the management of marketing campaigns, and the drive of sale activities. CRM/PMS systems are an example of computing systems where data associated with entities such as persons, organizations, accounts, and similar ones are maintained for various purposes.

However, the conventional technology using a practice management system or a customer relationship management do not have facility of providing some comprehensive business contextual information on a caller along with a conventional Caller ID, as in the conventional technology, PMS/CRM system are not integrated with telephony systems. Thus, when a user calls an enterprise, the PMS/CRM systems used by the enterprise do not have any comprehensive and necessary information about the caller. This results in wastage of research time as a valuable identification for the caller is not present. Additionally, conventional technology does not include any contextual system that can provide caller's information during calling procedure through a quick prompt. The conventional system is not user friendly and requires considerable experience to operate quickly and efficiently as they are designed to create a minimal bother to callers.

Thus, there exists a need for an user-friendly system that provides comprehensive and business contextual information about the caller with a phone ring in order to reduce research time on the caller as well as reducing holding time and the like. The present invention provides an application extension that integrates existing CRM/PMS systems with the existing telephone system. It also provides comprehensive business contextual pop-up info with a ring, and thus optimizes operations of call handling in an enterprise.

SUMMARY OF INVENTION

In a first aspect of the present invention, a system for providing contextual information of a caller is provided. The system comprises: an existing telephone service provider to fork a call from an external caller, to simultaneously ring a first dialed number as well as one or more target numbers associated with the first dialed number by using direct inward dialing, through a private branch exchange; an application extension installed on one or more clients' device associated with said one or more target numbers, said application extension on receiving ring on said one or more target numbers, search database of a CRM application to determine the presence of record of an external caller in a database of the CRM application, and initiating a process based on the determination. The application comprises a switching, logic and routing engine. The CRM application is a server based on the CRM application, a desktop based on the CRM application, and includes data used in business-to-business transactions, social media, contact center automation, call centers. The second internal line connected to the private branch exchange system has a direct dialing association. The client based application extension further comprises a teleprompter subsystem that provides a structured business contextual information and a teleprompter script on a user interface on the client device to walk the user through customer specific process. The client based application extension displays the caller ID information of the caller on the user interface. The process initiated by the client based application extension may comprise a process for known caller present in the CRM database or a process for unknown caller not present in the CRM database. The process for known caller comprises: presenting information about the caller to be displayed on the user interface; pre-filling contextual data entry forms for a previously entered customer. For a known caller, the user is provided with step-by-step instructions for the user to follow, allowing for facilitation of the process. The process for unknown caller comprises: searching internet directories to find details of the caller, displaying the searched information in contextual forms. The client based application extension displays contextual ad on the user interface.

In a second aspect of the present invention, a method for providing contextual information of a caller is provided. The method comprises: getting a call from an external caller forked at an existing service provider to simultaneously ring a first dialed number and one or more target numbers associated with the first dialed number using direct inward dialing, through a private branch exchange; determining by an application hosted on the private exchange system, as how the call on a private branch exchange system is routed to the one or more target numbers; providing an application extension on one or more clients' device associated with said one or more target numbers, which on receiving ring on said one or more target numbers, search database of a CRM application to determine the presence of record of the external caller in a database of the CRM application, and initiating a process based on the determination. The CRM application is a server based on a CRM application, a desktop based on a CRM application, and includes data used in business-to-business transactions, social media, contact center automation, and call centers. The method further comprises the step of: providing a structured business contextual information about the caller to a user interface on the client device. A teleprompter script is provided by the application extension on the user interface to walk the user through customer specific process. The caller ID information of the caller is displayed by the application extension on the user interface. The process initiated by the client based application extension comprises: a process for known caller present in the CRM database or a process for unknown caller not present in the CRM database. The process for known caller comprises: presenting information about the caller to be displayed on the user interface; pre-filling contextual data entry forms for a previously entered customer. For a known caller, the user is provided with step-by-step instructions for the user to follow, allowing for facilitation of the process. The process for unknown caller comprises: searching internet directories to find details of the caller, displaying the searched information in contextual forms.

BRIEF DESCRIPTION OF DRAWINGS

The preferred embodiment of the invention will hereinafter be described in conjunction with the appended drawings provided to illustrate and not to limit the scope of the invention, wherein like designation denote like element and in which.

DETAILED DESCRIPTION OF THE EMBODIMENTS

Figure 1:
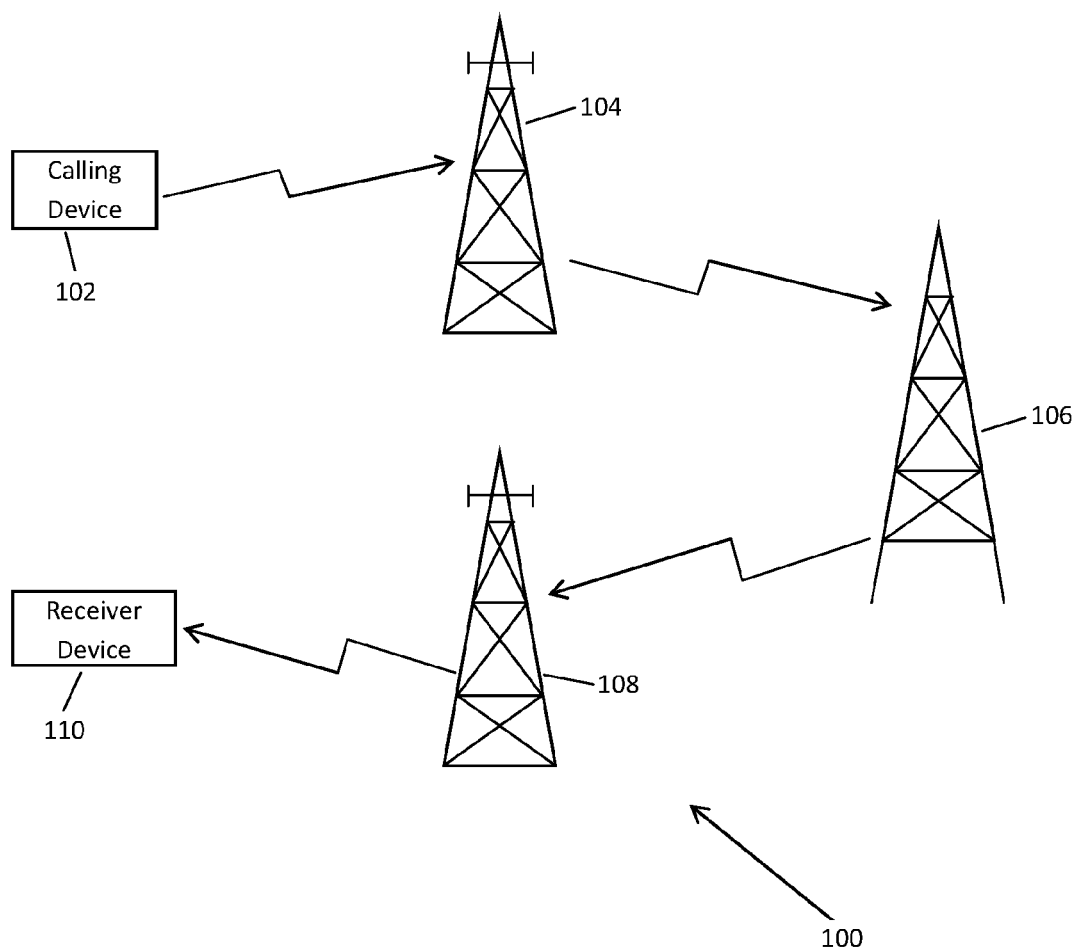
FIG. 1 represents a telecommunication system in accordance with an embodiment of the present invention.

In the following detailed description of embodiments of the invention, numerous specific details are set forth in order to provide a thorough understanding of the embodiment of invention. However, it will be obvious to a person skilled in art that the embodiments of invention may be practiced with or without these specific details. In other instances well known methods, procedures and components have not been described in details, so as not to unnecessarily obscure aspects of the embodiments of the invention.

Furthermore, it will be clear that the invention is not limited to these embodiments only. Numerous modifications, changes, variations, substitutions and equivalents will be apparent to those skilled in the art, without parting from the spirit and scope of the invention.

In an embodiment of the present invention provides, an application extension in form of software plug-in is provided that integrates existing PMS (Practice Management System) or CRM (Customer Relationship Management System) suite with existing telephone system. The application extension comprises an add-on and a teleprompter system. When an external caller calls a telephone number, the call gets forked at the existing telephone service provider to simultaneously ring the dialed telephone number and one or more target numbers associated with the destined telephone number. The line connected to the dialed number is the line one, and the line connected to the one or more target numbers associated with the dialed number is line 2 (L2). The line 2 (L2) is connected to the one or more target numbers through a private branch exchange system. A main application is residing on the private branch exchange system that determines how the call coming on line 2 (L2) is handled. The main application has a routing and logic engine to determine how the call will be routed or handled. The private branch exchange system is connected to one or more client device having the application extension in form of software plug-in. When the external caller calls to the destined number, the call gets also transferred to one or more associated target numbers. The application extension on the client device search a CRM or PMS database to determine whether the information on the caller is present in the CRM or PMS database. The application extension or the add-on system will then determine the next step based on the presence of caller information in the CRM database. The application extension comprises a teleprompter subsystem which pop-up a screen on a user interface of the networked client device, based on appropriate caller's status as an existing customer or otherwise. The user of the networked client device is then provided with business contextual information and/or a series of canned scripts that are designed to provide a structured series of easy-to-follow steps for the user to follow. The guided procedure allows the user with minimal training to perform customer service functions in an enterprise quickly and efficiently.

The present invention utilizes the concept of call forking or call splitting, where the external call is forked when the caller calls from an external telephone system that dials into the existing telephone system of an enterprise, otherwise known as a PBX (Private Branch Exchange). Call forking, also known as call splitting, is a process that enables a terminating gateway to handle multiple requests and an originating gateway to handle multiple provisional responses for the same call. It enables an incoming call to ring several extensions or other telephones present in the PBX. Private Branch Exchange (PBX) is a private telephone network typically used within an enterprise. Users of the PBX share a certain number of outside lines for making telephone calls external to the PBX. Generally, most medium-sized and larger companies use a PBX system because it is typically less expensive than connecting an external telephone line to every telephone in the organization. Furthermore, it is easier to call an individual within a PBX because the number the user needs to dial is typically just 3 or 4 digits, commonly known as an extension.

FIG. 1 represents a telecommunication system in which the invention can be implemented. The telecommunication system 100 comprises of a calling device 102, a base station 104 for the calling device 102, a mobile switching center 106, a receiver device 110 and a base station 108 for the receiver device 110. When the calling device 102 tries to establish a call to the receiver device 110, the calling device 102 firstly connects with the available service provider's network 104. The calling device 102 first scans the group of forward control channels to determine the strongest one. Then it keeps on monitoring the same channel until the signal level drops below a minimum level after which it again starts to scan. When a user dials a number to make a call from the calling device 102, a call initiation request is sent on the reverse control channel. Along with this request, the calling device 102 also sends its Identification Number (IN), Electronic Serial Number (ESN) and the dialed telephone number. The base station 104 receives this data and sends it to the Mobile Switching Center (MSC) 106. The MSC 106 validates the request by checking the IN with the records on its database. During this validation process, if the identification number is valid, then a connection to receiver device 110 is made through the base station 108 and the conversation begins. The Mobile Switching Center (MSC)

106 is responsible for routing and interconnecting the phone calls whether between two cell phones or between a cell phone and a landline telephone and the like.

The calling device and the receiver device may include a radiotelephone, a smartphone, a plain old telephone service, a personal communication system terminal, a personal computer, a personal digital assistant, a laptop, a VoIP-based device, or other types of computation or communication devices that can receive and/or initiate telephone calls. In another implementation, the calling device and/or receiver device may be wired or wireless multimedia devices that are capable of sending/receiving audio, video, and text information. The receiver device can also be a telephone system present in the Private Branch Exchange (PBX).

Figure 2:
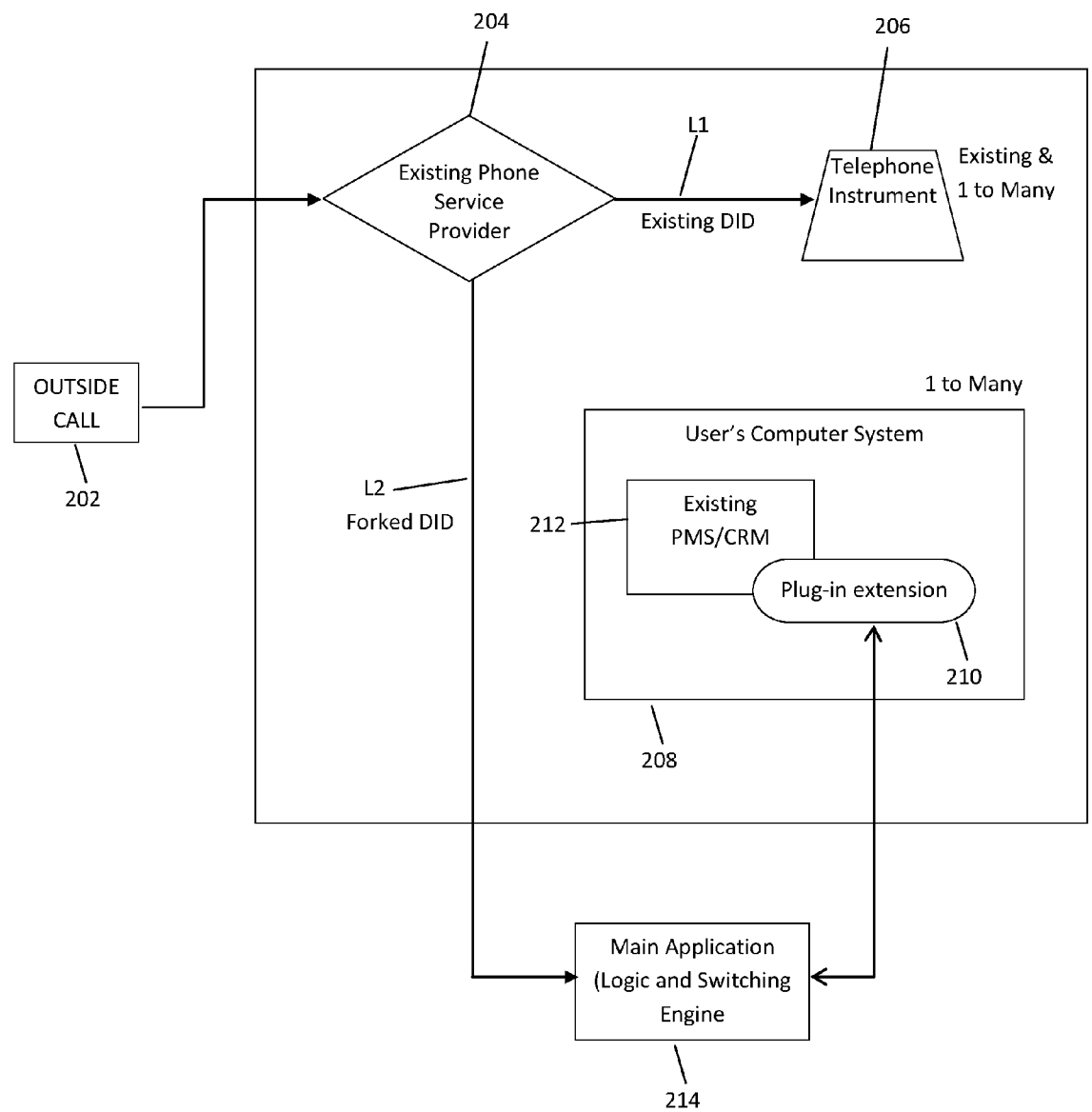
FIG. 2 illustrates a schematic representation of a system for integration of an existing CRM or PMS system with an existing phone system through a plug-in (a software extension) in accordance with an embodiment of the present invention.

FIG. 2 illustrates a schematic representation of a system for integration of an existing CRM or PMS system with an existing phone system through a plug-in (a software extension) in accordance with an embodiment of the present invention. The system 200 comprises an outside call 202, an existing phone service provider 204, an existing telephone system 206, a main application 214 and one or more networked device 208. The main application may be either hosted on a server or hosted in the PBX system. The one or more networked device is connected to a CRM database 212. An extension 210 to the main application 214 in form of software plug-in is installed on the one or more networked device 208. The extension 210 includes an add-on and a teleprompter subsystem. The CRM database may be a server based CRM database, a desktop based CRM database and the like and may include data used in business-to-business transactions, social media, contact center automation, call centers etc.

The outside call 202 is forked at a base station of a receiver device. The outside call is the call from an external telephone system or the calling device that dials into an existing telephone system of an enterprise, otherwise known as a PBX (Private Branch Exchange). In terms of physical location, the existing telephone system is possibly located inside an office or plurality of offices. PBX establishes connection between the telephone sets of two or more users by mapping a dialed number to a physical phone. When the call is forked to a specific enterprise, a single call can ring many endpoints at the same time. For instance, when a call is forked, a desk phone rings at the same time as another phone rings, allowing the person to take the call from either device easily. There can be two types of call forking: parallel forking and sequential forking. In parallel forking, when an outside call is initiated, all the devices connected in the system will ring and the response that reaches the originator first will establish a session with the receiver device and for the other response, a CANCEL will be triggered. In the sequential forking, the call will be forked to one device, if the first device is busy or unavailable at that time, the call will be forked to another device present in the communication system. When the outside call from the calling device is forked at the base station of the receiver device, the outside call will be ringing on the receiver device as well as the main application 214. In an embodiment of the present invention, the system can be implemented at distant locations for the same enterprise. For an instance, if an outside call is forked into two lines i.e. L1 and L2 present at same location, then that outside call can be forked for some other distant location as well.

The first major component of the present invention is the outside call 202. The outside call 202 is the call from an external telephone system that dials into the existing telephone system 206 of an enterprise, otherwise known as a PBX (Private Branch Exchange). The next major component of the system 200 is a forked DID. Direct Inward Dialing (DID) is a block of telephone numbers for calling into a private branch exchange (PBX) system. This is denoted by the notation "L2". L2 has a DID (Direct Inward Dialing) association. The forked DID line is the first point of contact between an existing phone service provider 204 and the main application 214. The DID allow the existing phone service provider 204 to communicate with main application 214 without requiring each to have a physical line connecting to the PBX. When the external users call, the line L1, which is the existing Direct Inward Dialing, it connects to the existing phone system/line or the existing telephone instrument 206 through the existing phone service provider 204. This outside call 202 is forked and/or routed, labeled as L2 (a forked DID), to the main application 214 with some configuration settings at the existing phone service provider 204. The main application 214 is hosted software that handles the majority of the decision making of the system 200. The main application 214 determines how the L2 call will be handled. This is what regulates incoming calls from the internal line "L2" and communicate appropriate instance of the extension (plug-in) 210 to the existing PRM/CRM 212 present at one or more networked device 208. The one or more networked device can be a desktop, a laptop, a personal computer, a tablet, a smartphone connected in a network. In an embodiment of the present invention, the existing telephone instrument 206 can provide one to one as well as one-to-many communication.

In an embodiment of the present invention, the main application 214 may be hosted on a cloud or a server. Alternatively, the main application 214 is present on the PBX system or on one or more networked device. The main application 214 contains enterprise's switching/logic/routing engine. The main application may be a type of central switching device or a routing engine that associates plurality of target phone numbers with an incoming telephone number. When an external telephone call on the main application is received, the main application or the routing engine signals its corresponding target plugin extensions (210) about the caller. The Session Initiation Protocol (SIP) is a communications protocol for signaling and controlling the ongoing communication between main application 214 and Plugin extension 210. The SIP is applicable in Internet telephony for voice and video calls, as well as instant messaging, over Internet Protocol (IP) networks.

The primary functionality of the main application is to communicate with the plug-in 210 and its teleprompter subsystem. The teleprompter subsystem will search the existing PRM or CRM database 212 to see if the outside caller is already in the existing PRM or CRM database 212, and then call the appropriate actions based on this outcome.

In an embodiment of the present invention, the plug-in 210 is implemented along with a teleprompter subsystem and the plug-in 210 is linked to the main application 214. The plug-in's teleprompter subsystem subcomponent provides a structured business contextual information and scripts to walk the receptionist or the user through the customer service process. The teleprompter subsystem subcomponent is designed to allow the user to conduct a comprehensive, orderly, customer service process without the need for much experience.

Figure 3:
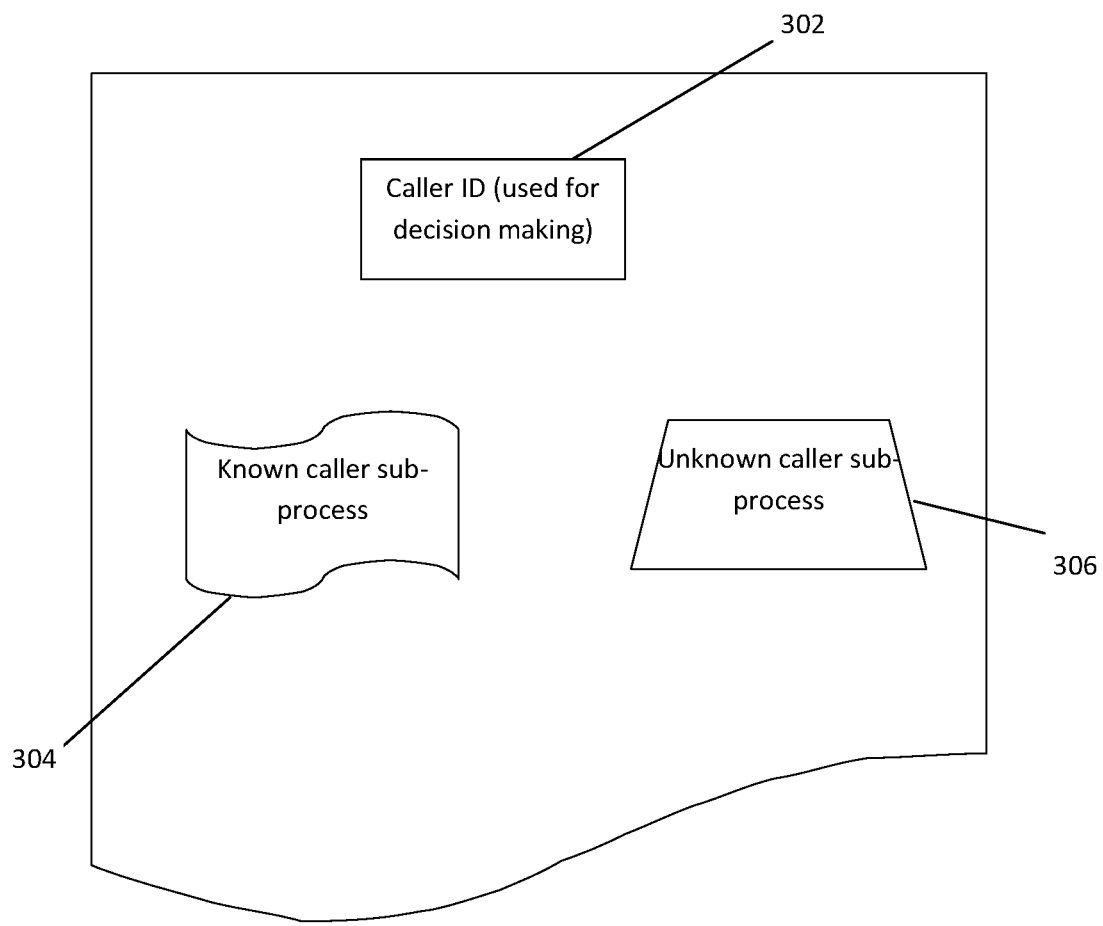
FIG. 3 represents components of a teleprompter subsystem of the plug-in in accordance with an embodiment of the present invention.

FIG. 3 represents components of a teleprompter subsystem of the plug-in in accordance with an embodiment of the present invention. The teleprompter subsystem of the plug-in 210 is comprised of three sub-components/sub-processes. The subcomponents are a caller ID subcomponent 302, a known caller sub-process 304, and an unknown caller sub-process 306. The caller ID subcomponent is a pure software based callers ID and its constituent processes. The teleprompter subsystem utilizes the information for business decision making and determining how to handle the call. The known caller sub-process 304 and the unknown caller sub-process 306 are called depending on the branching logic for the teleprompter system. The teleprompter subsystem calls the existing PMS/CRM 212 and searches for records of the caller based on the caller ID information.

The extension (plug-in) 210 on finding the details of the external caller in the CRM database, considered the external caller as a known caller. If the caller's detail is not present in the CRM database, the extension considered the caller as an unknown caller. Depending on the presence of caller in the CRM database, the extension initiates different process for the known caller and the unknown caller. The known caller and unknown caller sub-processes are called depending on the branching logic for the teleprompter system.

If the caller exists in the CRM database, the known caller sub-process 304 is called. Known information about the caller such past visits/meeting, future visits/meetings, past revenue, future revenue projections, for example in case of medical/dental office—insurance info, referrals, account balance, family members their birthdays, is displayed on the user interface. The user fielding the call will leverage the business contextual information and process contextual forms for entry. Business contextual data entry forms suitable for a previously-entered customer will be displayed to the user, ex., call notes, follow-up forms, performance surveys, etc. The user interface will display a guided series of forms for the user. There will be step-by-step instructions for the user to follow, allowing for facilitation of the process even in situations where the user has little or no experience.

If the caller is unknown and has not been previously entered into the system, the unknown caller sub-process 306 is called. In contrast to the known caller sub-process 304, system will search internet phone directories like YP/WP to find details on caller like name/address/Facebook account/email ID and display its findings via different set of form which may include demographic entry forms and industry based contextual forms, which are already pre-populated, hence less data entry to add them into system. Later forms may be similar to those seen in the known caller process due to natural advancement of processing the caller's case. As such, there may be overlap between some of the forms used in the known caller sub-process and the unknown caller sub-process.

Figure 4:
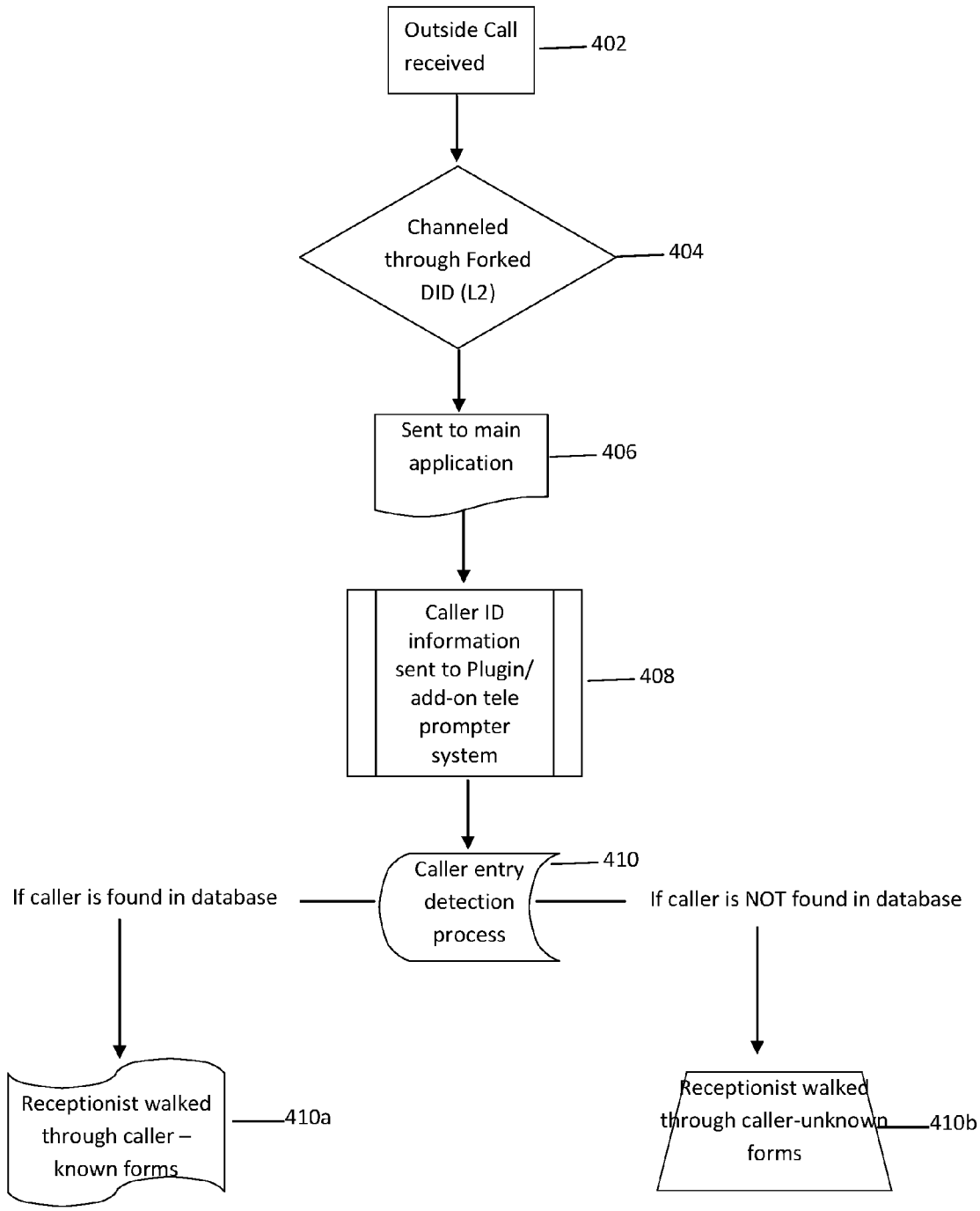
FIG. 4 illustrates a flow chart showing process of the present invention in accordance with an embodiment of the present invention.

FIG. 4 illustrates a flow chart showing process of the present invention in accordance with an embodiment of the present invention. When an outside call is received at step 402 at the existing phone service provider 204, the call is forked into two lines L1 and L2. The outside call is channeled through internal line L2, which is using direct inward dialing, at step 404 and then sent to the main application 214 at step 406. The callerID information of the outside caller is then sent to the extension (plug-in) 210 at step 408. The teleprompter subcomponent present in the plug-in 210 implements a caller entry detection process 410. If the caller is found in the existing CRM/PRM 212, then the call recipient or the user walks through the caller known forms at step 410*a* and if the caller is not present in the existing CRM/PRM 212, then the call recipient or the user walks through the caller unknown forms at step 410*b*.

In an embodiment of the present invention, the pop-up can appear on N numbers of networked devices 208.

Figure 5:
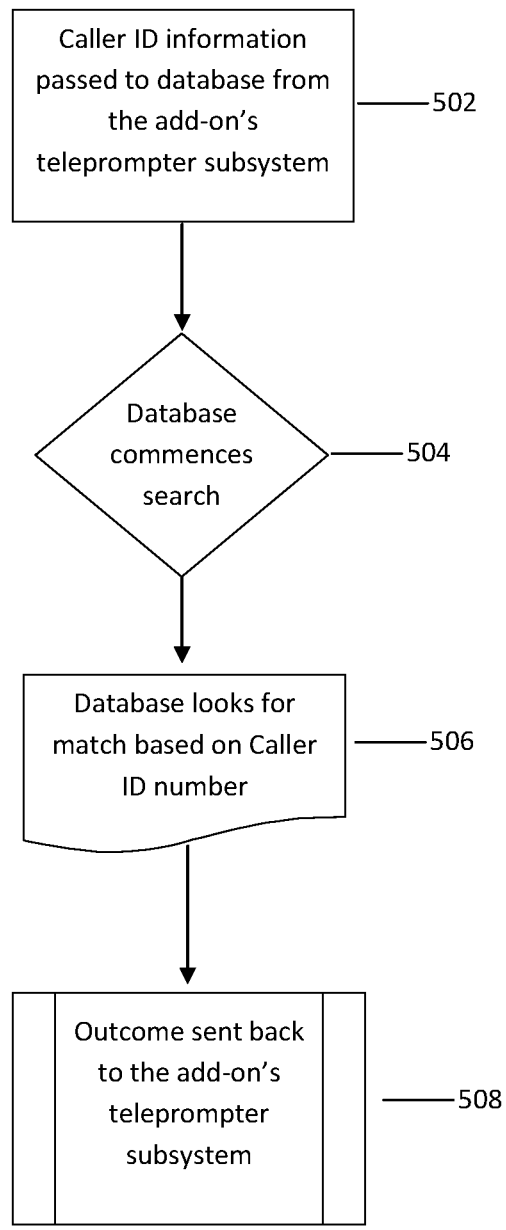
FIG. 5 represents workflow of a teleprompter subsystem of the plug-in in accordance with an embodiment of the present invention.

FIG. 5 represents workflow of a teleprompter subsystem of the plug-in in accordance with an embodiment of the present invention. As mentioned, which sub-process is called is determined by whether or not the caller is present in the existing PMS/CRM 212. At step 502, caller ID information is passed to the existing PMS/CRM 212 from the plug-in 210. The existing PMS/CRM 212 commences search at step 504. If the caller exists in the existing PMS/CRM 212, the known caller sub-process 304 is called. In an embodiment of the present invention, the known information about the caller, may be past visits/meeting, future visits/meetings, past revenue, future revenue projections, for example in case of medical/dental office—insurance info, referrals, account balance, family members their birthdays and the like, is displayed on the networked device (computer system) 208. The user fielding the call will leverage the business contextual information and process contextual forms for entry. Business contextual data entry forms suitable for a previously-entered customer will be displayed to the user, for e.g. call notes, follow-up forms, performance surveys, etc. The networked device (computer system) 208 will display a guided series of forms for the user. There will be step-by-step instructions for the user to follow, allowing for facilitation of the process even in situations where the user has little or no experience.

If the caller is unknown and has not been previously entered into the existing PMS/CRM 212, the unknown caller sub-process 306 is called. In contrast to the known caller sub-process 304, the networked device (computer system) 208 will search internet phone directories like yellow pages/white pages (YP/WP) to find details on caller like name/address/Facebook account/email ID and display its findings via different set of form which may include demographic entry forms and industry based contextual forms, which are already pre-populated, hence less data entry to add them into the existing PMS/CRM 212. Later forms may be similar to those seen in the known caller sub-process 304 due to natural advancement of processing the caller's case. As such, there may be overlap between some of the forms used in the known caller sub-process 304 and the unknown caller sub-process 306. Alternative or future embodiments of the invention may include different forms than those mentioned here, dependent on the evolving nature of the enterprise with which the users are associated. At step 506, after finding the relevant match, the outcome is sent back to the plug-in's teleprompter screen at step 508.

In other words, after deciding which side processes the call either the known caller sub-process 304 or the unknown caller sub-process 306; the caller's line is designated to the internal line "L2". It then sends a message to the main application 214, which is connected with the enterprise's PMS/CRM system. The main application 214 then signals the plug-in 210 with its constituent teleprompter subsystem. The teleprompter subsystem queries the existing PMS/CRM 212 and determines if the caller is in the existing PMS/CRM 212 or not. The subsystem then decides which caller-specific processes to execute, based on the outcome.

The user or the recipient on their desktop/tablets walks through the series of forms appropriate to the caller's status.

Figure 6:
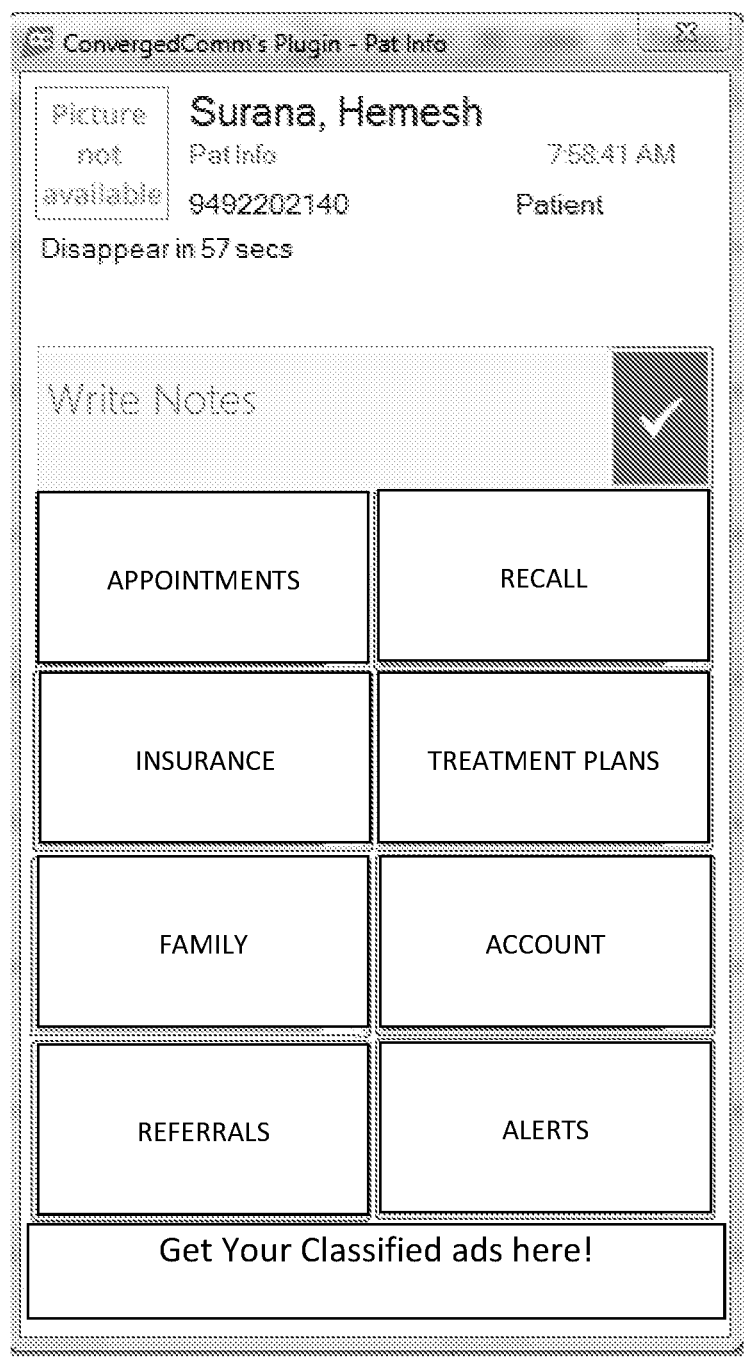
FIG. 6 represents a user screen prompted on a user system in accordance with an embodiment of the present invention.

FIG. 6 represents a user screen prompted on a user system in accordance with an embodiment of the present invention. When an outside caller calls the enterprise, the recipient's system or the networked device (computer system) 208 is prompted with an interface representing contextual teleprompter script and actionable checklist/forms to help communicate with caller and take appropriate information and take action. In an embodiment of the present invention, the user interface displays contextual Advertisements with Caller ID.

When the outside caller calls, user interface prompted on the recipient's computer or the networked device (computer system) 208 may represent various fields like caller's account information, insurance, prior appointments, treatment plans and the like. The user is prompted with the user interface screen on her computer, based on appropriate caller's status as an existing customer or otherwise. The user is then provided with business contextual information and/or a series of canned scripts, designed to provide a structured series of easy-to-follow steps for the user to follow. This guided procedure allows users with minimal training to perform customer service functions in an enterprise quickly and efficiently.

Further, the user screen also shows a contextual advertisement that is relevant for the caller. The contextual advertisement is a targeted advertisement that will be selected and served by automated systems those are based on the identity of the user and the content displayed. The automated system for the contextual advertisement scans the text of a website for keywords and returns the advertisements to the user screen based on those keywords. For example, if the recipient is viewing a website, concerning travelling in china and see that the user screen pops up offering a special price on a flight to Beijing, that's a contextual advertisement.

Although the invention has been explained in relation to its preferred embodiment, it is to be understood that many other possible modifications and variations can be made without departing from the spirit and scope of the invention. Obvious changes, modifications, and substitutions may be made by those skilled in the art to achieve the same purpose the invention. The exemplary embodiments are merely examples and are not intended to limit the scope of the invention. It is intended that the present invention cover all other embodiments that are within the scope of the descriptions and their equivalents.

The methods and processes described herein may have fewer or additional steps or states and the steps or states may be performed in a different order. Not all steps or states need to be reached. The methods and processes described herein may be embodied in, and fully or partially automated via, software code modules executed by one or more general purpose computers. The code modules may be stored in any type of computer-readable medium or other computer storage device. Some or all of the methods may alternatively be embodied in whole or in part in specialized computer hardware. The systems described herein may optionally include displays, user input devices (e.g., touchscreen, keyboard, mouse, voice recognition, etc.), network interfaces, etc.

The results of the disclosed methods may be stored in any type of computer data repository, such as relational databases and flat file systems that use volatile and/or non-volatile memory (e.g., magnetic disk storage, optical storage, EEPROM and/or solid state RAM).

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

The networked devices described herein may be in the form of a mobile communication device (e.g., a cell phone), laptop, tablet computer, interactive television, game console, media streaming device, head-wearable display, virtual or augmented reality device, networked watch, etc. The networked devices may optionally include displays, user input devices (e.g., touchscreen, keyboard, mouse, voice recognition, etc.), network interfaces, etc.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others.

We claim:

1. A system for providing real time contextual information about an inbound caller integrated from various sources, the system comprising:
    an existing service provider who implements call forking technology to fork an inbound call to simultaneously ring a first DID (direct inward dialing) and one or more DIDs (direct inward dialings), the first DID is the actual dialed number by the inbound caller and the one or more DIDs are assigned by the system;
    a Plug-in associated to the one or more assigned DIDs are installed on one or more client devices which upon receiving a signal from the system search an integrated database of a customer relationship management (CRM) application and public directories, to determine the presence of record of the inbound caller DID in a database of the customer relationship management (CRM) application and public directories, and initiating a process based on the determination;
    wherein a user interface of said one or more client device simultaneously displays a pop-up with structured comprehensive information about the inbound caller.

2. The system of claim 1, further comprising a private branch exchange that comprises a routing engine to map the first DID with said one or more system assigned DIDs.

3. The system of claim 1, wherein the customer relationship management (CRM) application is a server based customer relationship management (CRM) application, or a desktop based customer relationship management (CRM) application.

4. The system of claim 1, wherein the customer relationship management (CRM) application comprises data used in business-to-business transactions, social media, contact center automation, call centers.

5. The system of claim 1, wherein the plug-in provides a teleprompter script on a user interface of said one or more client device to walk a user through customer specific process.

6. The system of claim 1, wherein the plug-in displays information of the inbound caller, such as caller's account information, insurance, prior appointments, treatment plans which can be defined by user using the system, on the user interface of said one or more client device.

7. The system of claim 1, wherein the process initiated by the plug-in comprises a process for known caller present in the customer relationship management (CRM) database or a process for unknown caller not present in the customer relationship management (CRM) database.

8. The system of claim 7, wherein if the inbound caller is a known caller, the process comprises: presenting information about the caller to be displayed on the user interface; pre-filling contextual data entry forms for a previously entered customer.

9. The system of claim 7, wherein if the inbound caller is a known caller, the user is provided with check list for the user to follow, allowing for facilitation of the process.

10. The system of claim 7, wherein if the inbound caller is an unknown caller, the process comprises: searching internet directories to find details of the caller, displaying the searched information in contextual forms.

11. The system of claim 7, wherein the plug-in display contextual advertisement on the user interface based on user logged in/date/time.

12. A method for providing contextual information of a caller, the method comprising:
    getting a call, from an external caller, forked at an existing service provider to simultaneously ring an existing dialed number and one or more plugin extensions associated with the existing dialed number using direct inward dialing, through a private branch exchange;
    determining, by a routing engine linked with an application extension installed on one or more client device and hosted on the private exchange system, routing of the call on a private branch exchange system to the one or more plugin extensions, which on receiving signal on said one or more plugin extensions, search an integrated database of a customer relationship management (CRM) application to determine the presence of record of the external caller in a database of the customer relationship management (CRM) application, and initiating a process based on the determination followed by simultaneously displaying a pop-up with structured comprehensive information about the external caller on a user interface of the one or more client device.

13. The method of claim 12, wherein the customer relationship management (CRM) application is a server based customer relationship management (CRM) application; a desktop based customer relationship management (CRM) application, and includes data used in business-to-business transactions, social media, contact center automation, call centers.

14. The method of claim 13, wherein a teleprompter script is provided by the application extension on the user interface to walk the user through customer specific process.

15. The method of claim 13, wherein the caller ID information of the caller, such as caller's account information, insurance, prior appointments, treatment plans, is displayed by the application extension on the user interface.

16. The method of claim 13, wherein the process initiated by the client based application extension comprises: a process for known caller present in the customer relationship management (CRM) database or a process for unknown caller not present in the customer relationship management (CRM) database.

17. The method of claim 16, wherein the process for known caller comprises:
   presenting information about the caller to be displayed on the user interface; pre-filling contextual data entry forms for a previously entered customer.

18. The method of claim 16, wherein for a known caller, the user is provided with step-by-step instructions for the user to follow, allowing for facilitation of the process.

19. The method of claim 16, wherein the process for unknown caller comprises:
   searching internet directories to find details of the caller, displaying the searched information in contextual forms.

* * * * *